UNITED STATES PATENT OFFICE.

WILLIAM CROSS, OF BRISBANE, QUEENSLAND.

METHOD OF PRESERVING TIMBER.

SPECIFICATION forming part of Letters Patent No. 643,762, dated February 20, 1900.

Application filed September 1, 1899. Serial No. 729,249. (No specimens.)

*To all whom it may concern:*

Be it known that I, WILLIAM CROSS, a subject of the Queen of Great Britain and Ireland, residing at Logan road, in the city of Brisbane, Colony of Queensland, have invented a certain new and useful Improved Method of Preserving Timber and other Material, (for which I have obtained a patent in Tasmania, No. 2,411, bearing date April 12, 1899,) of which the following is a specification.

My invention relates to an improved method of preserving timber and other material, and is particularly applicable to arresting the attacks of the teredo in wharf piles and timbers and of white ants in railway-sleepers and in any other timber or material liable to attack, which I effect by impregnating the timber or other material with certain chemical solutions in the manner hereinafter explained, which consist, first, in treating the wood with a solution of arsenious acid and an alkali, and, secondly, with a solution of sulfate of copper, which I prepare in the following manner:

A common iron boiler of the size suited to the operations to be carried on is provided. I then dissolve in every two gallons of water, by boiling, three-fourths of a pound of caustic soda or one pound of carbonate of potash (pearlash) or two and one-fourth pounds of soda-crystals. To this I add one pound of arsenic (arsenious acid) and boil the whole until thoroughly dissolved. This I will call solution "No. 1." I then dissolve in every two gallons of water one pound of sulfate of copper, which solution I call "No. 2." These solutions are both soluble poisons, but when combined form a nearly-insoluble poison—viz., arsenite of copper. If applied in the latter form to most materials, it would not penetrate to any extent. I therefore apply the two solutions at different times—first, solution No. 1, which I may apply with a brush, or the timber or other material may be immersed therein or the solution forced in under hydraulic pressure, and it being an alkaline soluble poison is very penetrating. After allowing the timber or other material to dry, or nearly so, I apply the No. 2 solution, which, combining with No. 1 in the timber or other material, forms a nearly-insoluble deadly poison, resisting for a long period the attacks of teredo, white ants, and such like insect forms and also arresting vegetable growth.

As a further protection, especially for wharf-piles and river-walls, I may employ an outer coating of tar and bitumen, which is prepared as follows: To every gallon of boiling tar I add one pound of bitumen, which I prefer to previously boil for three to four hours or until such time that by dropping a small quantity onto a sheet of metal it will leave the metal freely and without stain.

Both solutions may be applied hot or cold and the outer coating applied hot.

In treating teredo-infested timber I add to solution No. 1 one-fourth to one-half pound yellow prussiate of potash, (ferro-cyanide of potassium.)

I do not confine myself to the exact proportions of the ingredients given. The quantities are merely approximate.

I would have it understood that I do not claim the herein-specified solutions; but What I do claim, and desire to secure by Letters Patent, is—

The method herein described, consisting in first impregnating timber with a solution of arsenious acid and an alkali and afterward applying a solution of sulfate of copper.

In witness whereof I have hereunto set my hand in presence of two witnesses.

WILLIAM CROSS.

Witnesses:
 EDWARD HILL,
 JAMES HOODE.